United States Patent [19]
Strine et al.

[11] Patent Number: 6,166,391
[45] Date of Patent: Dec. 26, 2000

[54] URANIUM OXIDE SHIPPING CONTAINER

[75] Inventors: Roger E. Strine; Ronald L. Downing; Gregory B. Fornasiero; Lon E. Paulson, all of Wilmington, N.C.

[73] Assignee: General Electric Company, Schenectady, N.Y.

[21] Appl. No.: 09/315,729

[22] Filed: May 21, 1999

[51] Int. Cl.[7] .................................................. G21F 5/00
[52] U.S. Cl. ................................. 250/507.1; 250/506.1
[58] Field of Search ........................... 250/506.1, 507.1; 376/272

[56] References Cited

U.S. PATENT DOCUMENTS

| | | | |
|---|---|---|---|
| 3,935,467 | 1/1976 | Gablin | 250/507.1 |
| 4,023,317 | 5/1977 | Burgeson | 250/506.1 |
| 4,560,069 | 12/1985 | Simon | 250/506.1 |
| 4,803,042 | 2/1989 | Gilmore et al. | 376/272 |
| 4,815,605 | 3/1989 | Brissier et al. | 250/506.1 |
| 5,438,597 | 8/1995 | Lehnert et al. | 250/507.1 |

*Primary Examiner*—Bruce C. Anderson
*Attorney, Agent, or Firm*—Nixon & Vanderhye

[57] ABSTRACT

The uranium oxide shipping container includes an outer container having a plurality of cavities for receiving inner containers containing uranium oxide. The cavities comprise sleeves in the outer container body for receiving the inner containers in an ordered, preferably 3×3 array, in the outer container. Plastic foam material of different densities is provided in interstices between the sleeves and between the sleeves and the container walls. A container cover having high density polyurethane foam along its undersurface has recesses for receiving the upper margins of inner containers. The inner containers have side walls comprised of layered stainless steel, a nuclear poison such as cadmium, a nuclear moderator such as polyethylene, optionally a ceramic material for improved fire resistance and an outer wall of stainless steel.

17 Claims, 11 Drawing Sheets

URANIUM OXIDE SHIPPING CONTAINER

TECHNICAL FIELD

The present invention relates to a container for shipping uranium oxide in discrete canisters within an outer container and particularly relates to a uranium oxide shipping container constructed, inter alia, to ensure criticality safety and arranged to maximize uranium oxide mass per unit volume.

BACKGROUND OF THE INVENTION

Currently, uranium oxide is shipped in discrete containers which resemble the conventional 55-gallon drum. Each container has an outside metal sleeve surrounding a layer of insulation. The insulation layer, in turn, surrounds and encapsulates a single inner canister which contains the uranium oxide. These drum-like containers are typically shipped in a seavan carrier which essentially is a large trailer-size shipping carrier having approximate dimensions of 20×8×8. Current practice is to individually pack approximately 54 of these drum-like containers into the seavan consistent with the need to ensure criticality safety, i.e., to control neutron migration and avoid a critical mass. The volume of uranium oxide capable of being shipped in these drum-like canisters is relatively small and each container requires individual handling. Thus, there has been found a need to ship uranium oxide in a more efficient manner, increasing its mass per unit volume thereby reducing labor and shipping charges while ensuring criticality safety.

BRIEF SUMMARY OF THE INVENTION

In accordance with an embodiment of the present invention, there is provided a novel and improved multi-cavity uranium oxide shipping container which confines a plurality of inner containers in a manner ensuring criticality safety, as well as significantly increasing the mass of uranium oxide per unit volume which can be shipped. Particularly, the present invention provides an outer container having a container body and a cover. The container body includes an ordered array of cavities for receiving discrete inner containers which hold the uranium oxide. To ensure criticality safety while maximizing the mass per unit volume, each inner container has a side wall which is layered with a nuclear poison and a nuclear moderator. For example, the stainless steel inner wall of the inner container is lined along its exterior side with cadmium, a nuclear poison, and polyethylene, a moderator. The moderator slows the neutrons for capture by the cadmium poison. A ceramic material may also overlie the moderator and poison for enhanced fire protection. The uranium oxide may be provided in discrete pails or in bag form for disposition within the inner containers, the inner containers having a lid for closing the containers.

The cavities of the outer container preferably comprise stainless steel cylindrical sleeves which upstand from the bottom of the outer container in an ordered array, for example, a preferred 3×3 array. The space between the sleeves is filled with a foamed plastic material, e.g., polyurethane foam. The space between the outermost inner containers and the walls of the outer container is likewise filled with a foam material, e.g., polyurethane. The latter outer space, however, has a higher density of foam material than the density of the interior foam material. Consequently, the higher density foam material along the outer margins of the container body forms a fire and impact-resistant layer between the container body and the inner containers, while the lower density foam plastic material forms additional fire and impact protection. A cover plate is provided over the container body and has discrete openings in registration with the sleeves within the container body whereby the inner containers can be readily disposed within the sleeves.

The outer container also includes a cover which, in use, is sealed to the container body. The cover includes a layer of high density foamed plastic material, e.g., polyurethane, along its underside. A plurality of downwardly opening recesses are disposed in the plastic material for receiving the upper ends of the inner containers which project through the openings in the cover plate. Consequently, the inner containers are completely encapsulated within the outer container with impact and fire-resistant foam between the inner containers and between the inner containers and the outer container.

In a preferred form of the present invention, the outer container body includes pairs of elongated, generally rectilinear receptacles for receiving the tines of a forklift, the receptacles being formed to intersect one another. In this manner, the outer container can be lifted by a forklift with the tines of the forklift entering the guides from any side of the container. Additionally, one or more plugs formed of a material meltable at a predetermined temperature are provided in the wall of the outer container. In the event of a fire, any expanding gases of the foamed plastic materials may thus be released through openings vacated by the melted plug such that the container does not rupture.

In a preferred embodiment according to the present invention, there is provided a uranium oxide shipping container comprising an outer container and a plurality of inner storage containers arranged in an ordered array within the outer container and spaced from one another and from the outer container, each inner storage container comprising a cylinder for carrying a predetermined quantity of uranium oxide, the cylinder having a closed top, a closed bottom, and a cylindrical side wall having layered a nuclear poison and a nuclear moderator about the side wall, the spaces between the inner storage containers and between the inner storage containers and the outer container being filled with a plastic material.

DETAILED DESCRIPTION OF THE INVENTION

Figure 1:
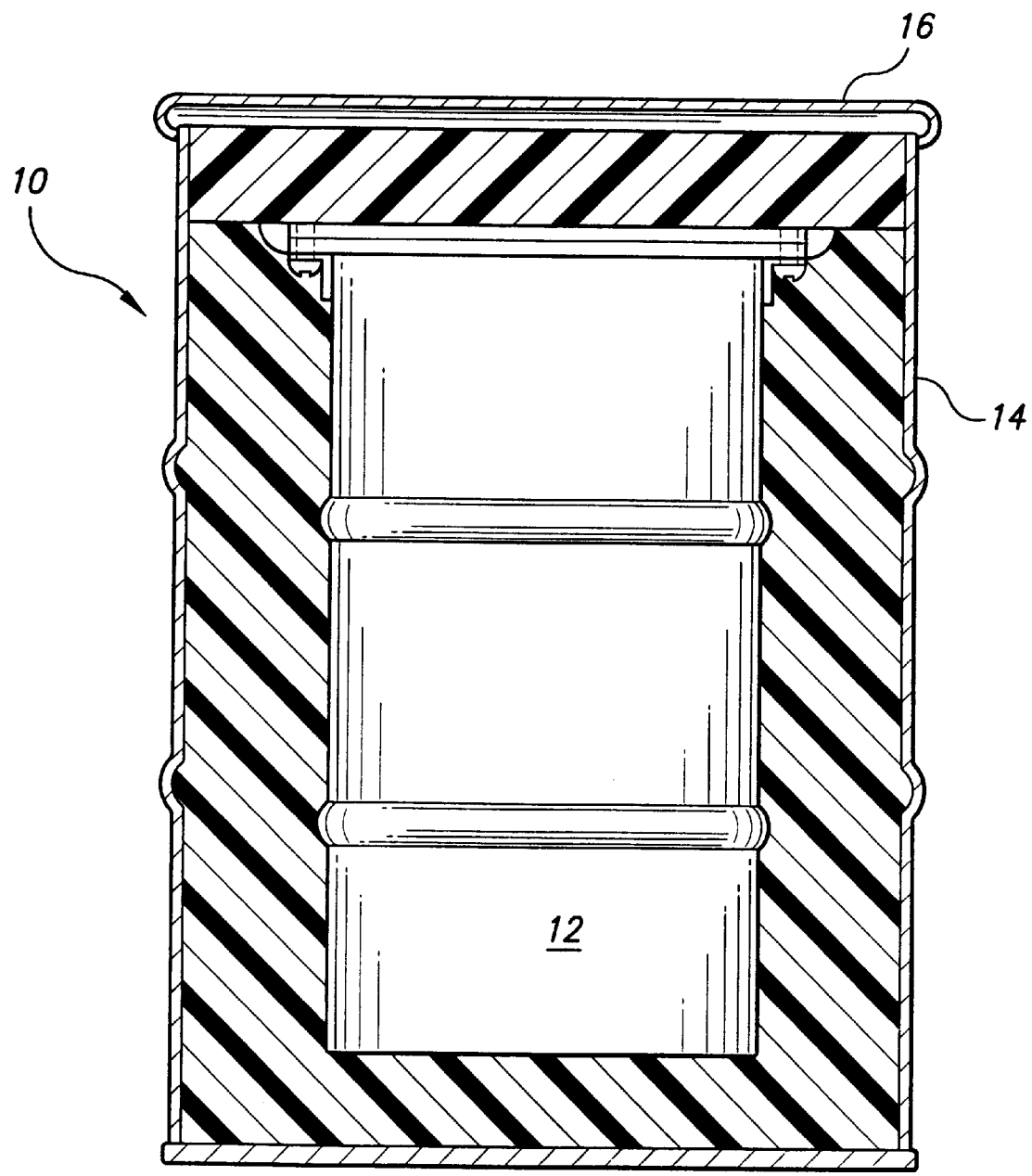
FIG. 1 is a cross-sectional view of a prior art drum-like barrel used for shipping uranium oxide.

Referring to the drawings, particularly to FIG. 1, there is illustrated a prior container, generally designated 10, for shipping uranium oxide. The container 10 includes an inner canister 12 in which the uranium oxide is disposed, an outer container 14 surrounding the inner canister 12 and having a removable lid 16, together with insulation material, generally a plastic material, disposed between the outer wall and lid and the inner canister 12. The container 10 is similar to a standard 55-gallon drum and has been used for years as a standard shipping container for uranium oxide.

Figure 2:
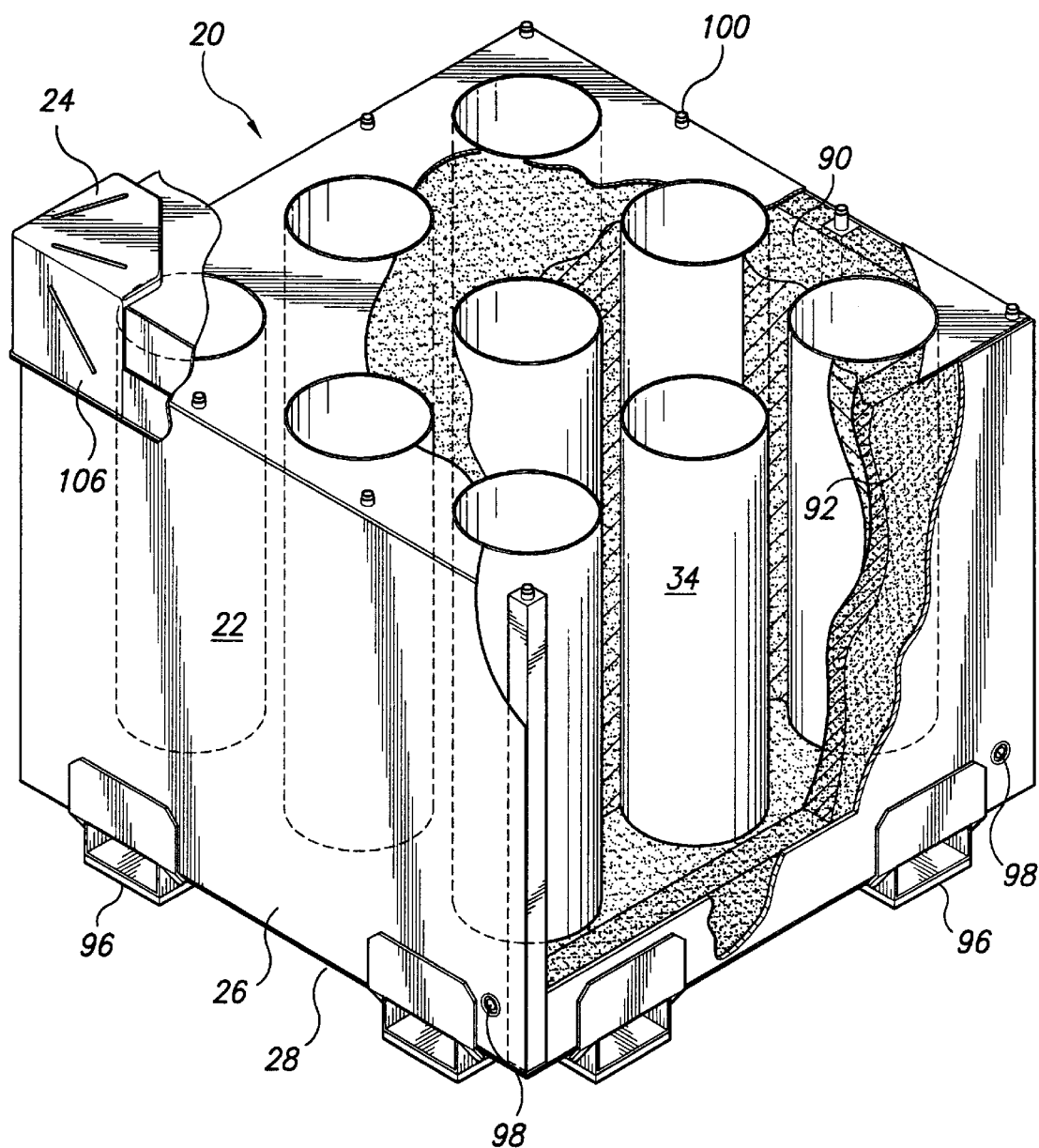
FIG. 2 is a perspective view with parts broken out and in section illustrating a container according to the present invention.

Referring now to FIG. 2, there is illustrated a container constructed in accordance with the present invention and generally designated 20, comprising an outer container body 22 and a lid 24. The container body 22 is generally rectilinear, having side, bottom and top walls 26, 28 and 30, respectively, for confining a plurality of inner containers, generally designated 32 in FIG. 3, in an ordered array within the outer container body 22. Within container body 22 are a plurality of cavities, preferably defined by contamination sleeves 34 into which the inner containers are received for shipping. Before describing in detail the outer container body and the cover therefor, a description of the inner containers 32 follows.

Figure 3:
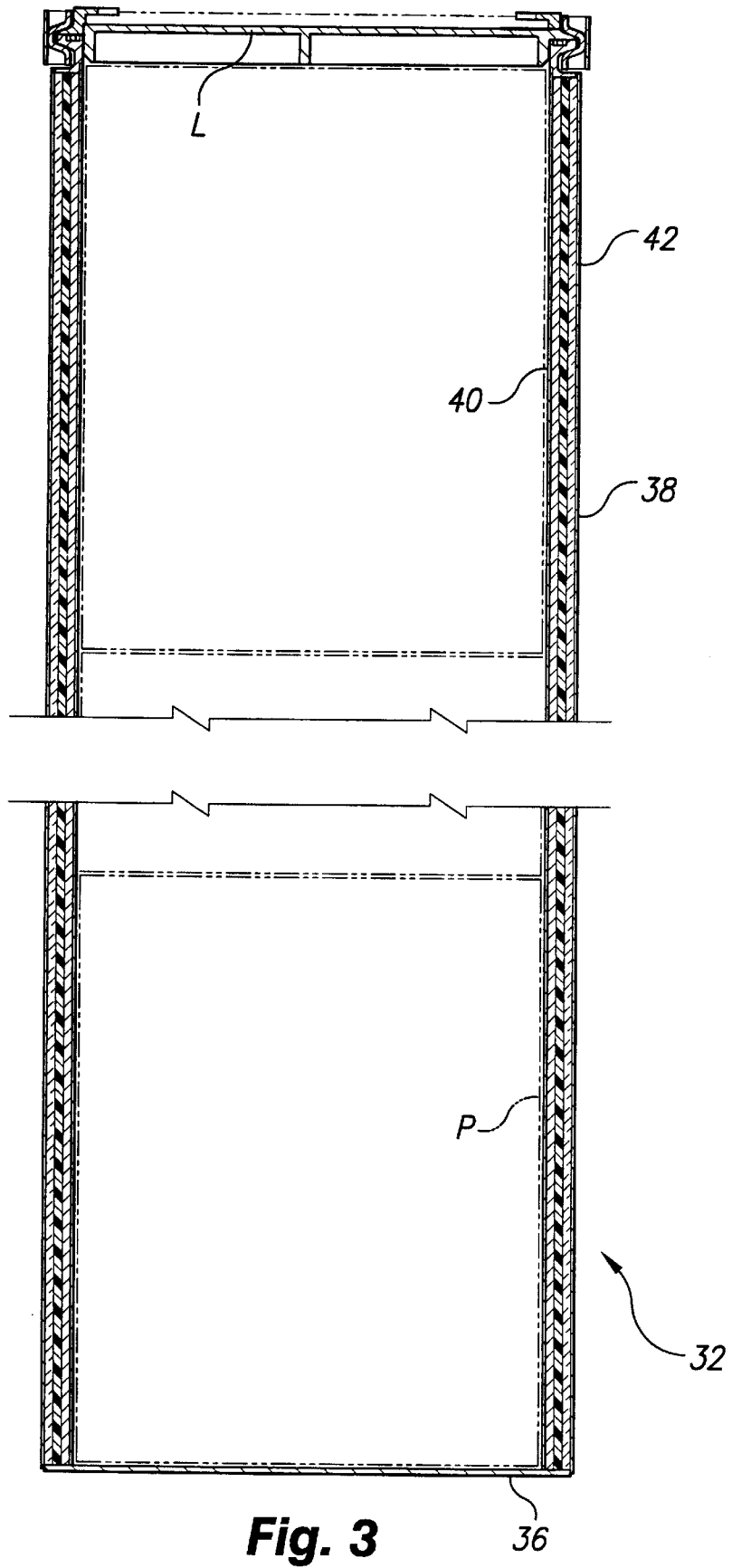
FIG. 3 is a cross-sectional view of one of the inner containers according to the present invention.
Figure 4:
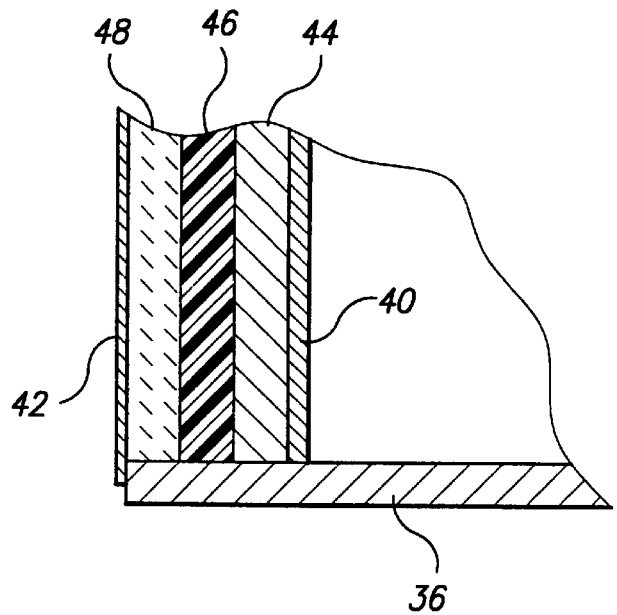
FIG. 4 is an enlarged fragmentary cross-sectional view illustrating a layered side wall of the inner container hereof.

Referring to FIGS. 3 and 4, each of the inner containers comprises a bottom wall 36, a top lid L and a cylindrical side wall 38. The bottom wall 36, as well as the inner and outer walls 40 and 42 forming the side wall 38 are formed of stainless steel. Interposed between the inner and outer walls 40 and 42 of side wall 38 is a layered arrangement which preferably includes a nuclear poison 44 and a nuclear moderator 46. As best illustrated in FIG. 4, the nuclear poison 44 overlies the outer surface of the interior wall 40 and the nuclear moderator 46 overlies the outer surface of the nuclear poison 44. The nuclear poison 44 is preferably cadmium for absorbing neutrons, while the nuclear moderator 46 is preferably a plastic material, for example, polyethylene. Optionally, for additional fire protection, a ceramic layer 48 may be interposed between the nuclear moderator 46 and the exterior wall 42 of side wall 38. Thus, the nuclear poison and nuclear moderator, and ceramic material where provided, are sandwiched between interior and exterior walls 40 and 42, respectively, of side wall 38. The bottom wall 36 and lid L preferably do not contain the nuclear poison and moderator or ceramic material but may contain those substances if desired. The uranium oxide may be placed in pails P disposed in the inner containers 32, three such parts P being illustrated in FIG. 3.

Figure 5:
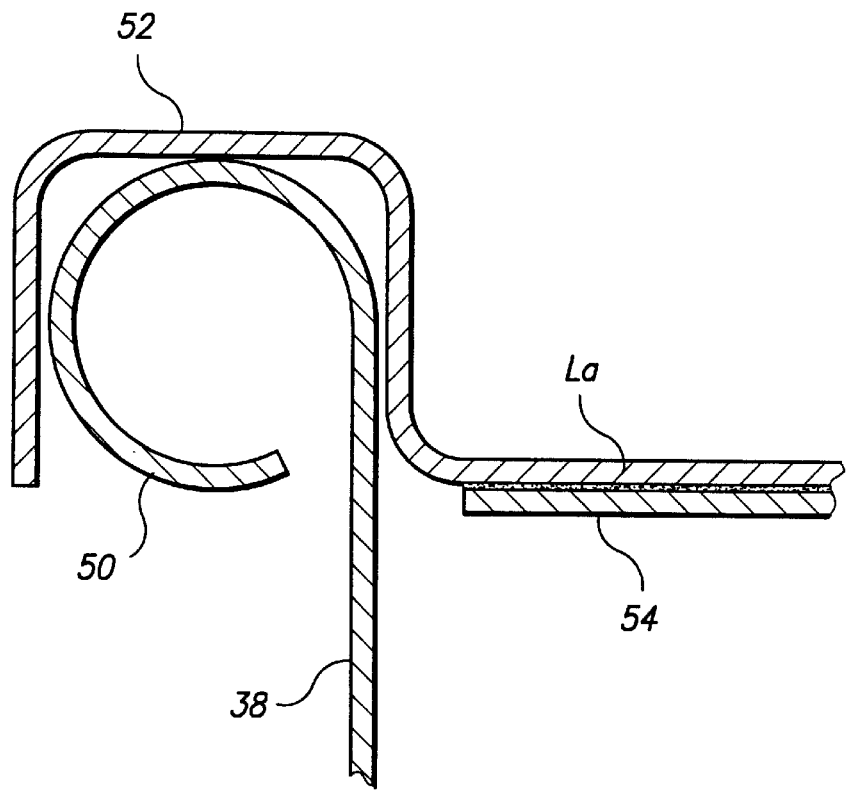
FIG. 5 is a fragmentary cross-sectional view illustrating a preferred connection between the lid and mounting flange of a preferred form of inner container hereof.

In FIGS. 5–8, there are illustrated three different types of connections between the lid L and the side wall 38 of the inner container 32. Referring to FIG. 5, the side wall 38 is rolled outwardly to form a radiussed mounting flange 50. The lid La includes a marginal annular channel 52 for overlying the rolled flange 50. Suitable seals may be provided between the lid La and the flange 50. The lid in this form may be reinforced by a plate 54 welded onto the bottom of the lid. A suitable clamp, such as an annular C-shaped clamp, not shown, may be positioned about the channel 52 and flange 50 to secure lid La to the container 32. Also, a suitable seal, such as an O-ring seal, not shown, may be interposed between flange 50 and channel 52 to seal the container 32.

Figure 6:
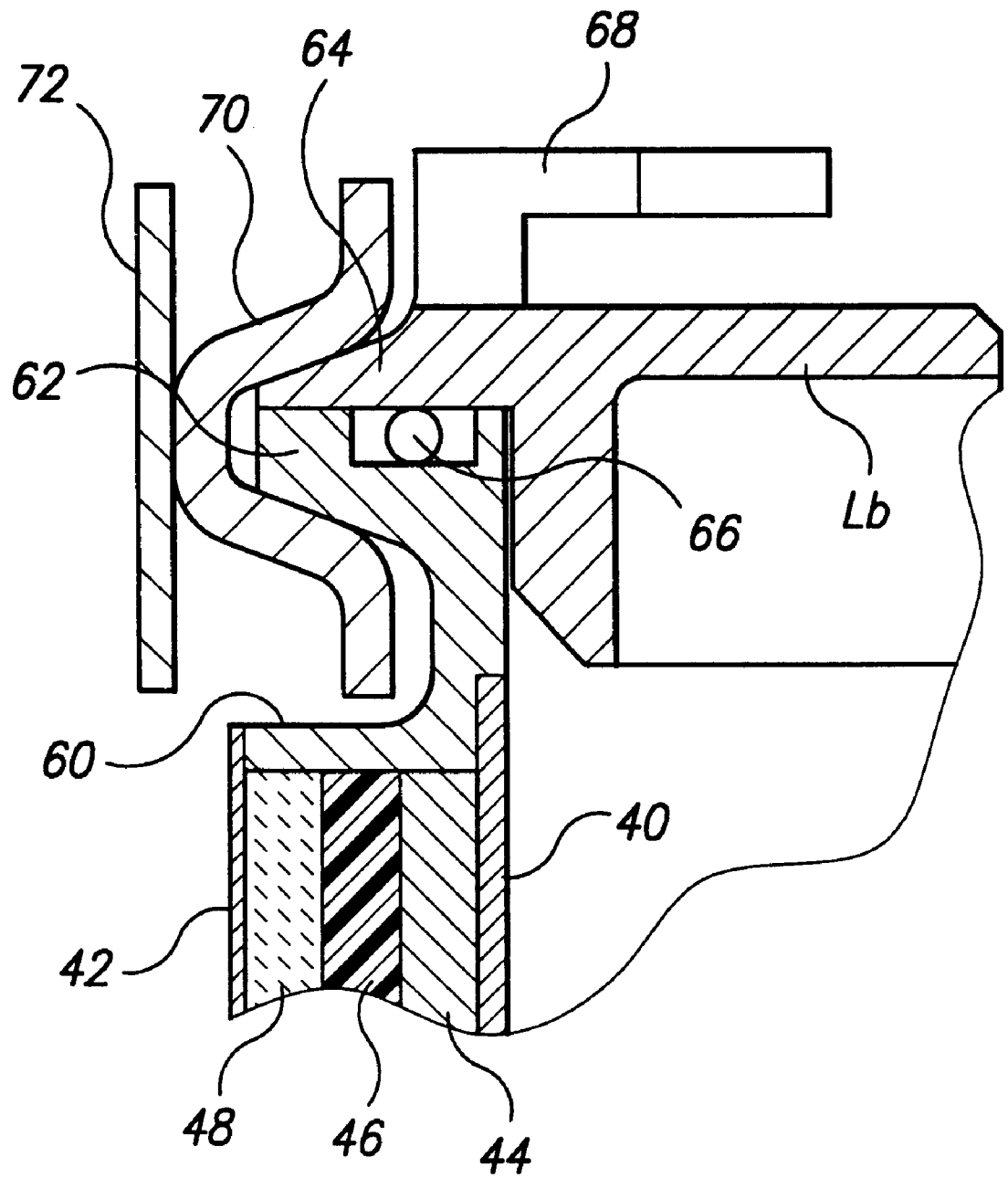
FIG. 6 is a cross-sectional view illustrating a second form of joint between an inner container wall and a lid.

Referring to FIG. 6, a mounting flange 60 is secured, preferably by welding, to the side wall 38 of the inner container 32. The mounting flange 60 has an outwardly directed annular flange 62. The lid Lb in this form has a radially outwardly directed flange 64 for overlying the flange 62. Between the two flanges 62 and 64, there is provided an O-ring-type seal 66. The lid Lb also includes a plurality of handle elements 68 projecting from the outer face of the lid whereby the inner containers 32 can be handled by machinery, such as cranes.

To secure the lid Lb of FIG. 6 to the mounting flange 60, an annular clamp 70 having a generally C-shaped configuration is wrapped about the confronting joined flanges 62 and 64 with opposite ends being welded to one another. An outer clamping band 72 is secured peripherally about the clamp 70, the band 72 having a threaded fastener at its opposite ends which, by a threading action, tightens the band 72 about the clamp 70.

Figure 7:
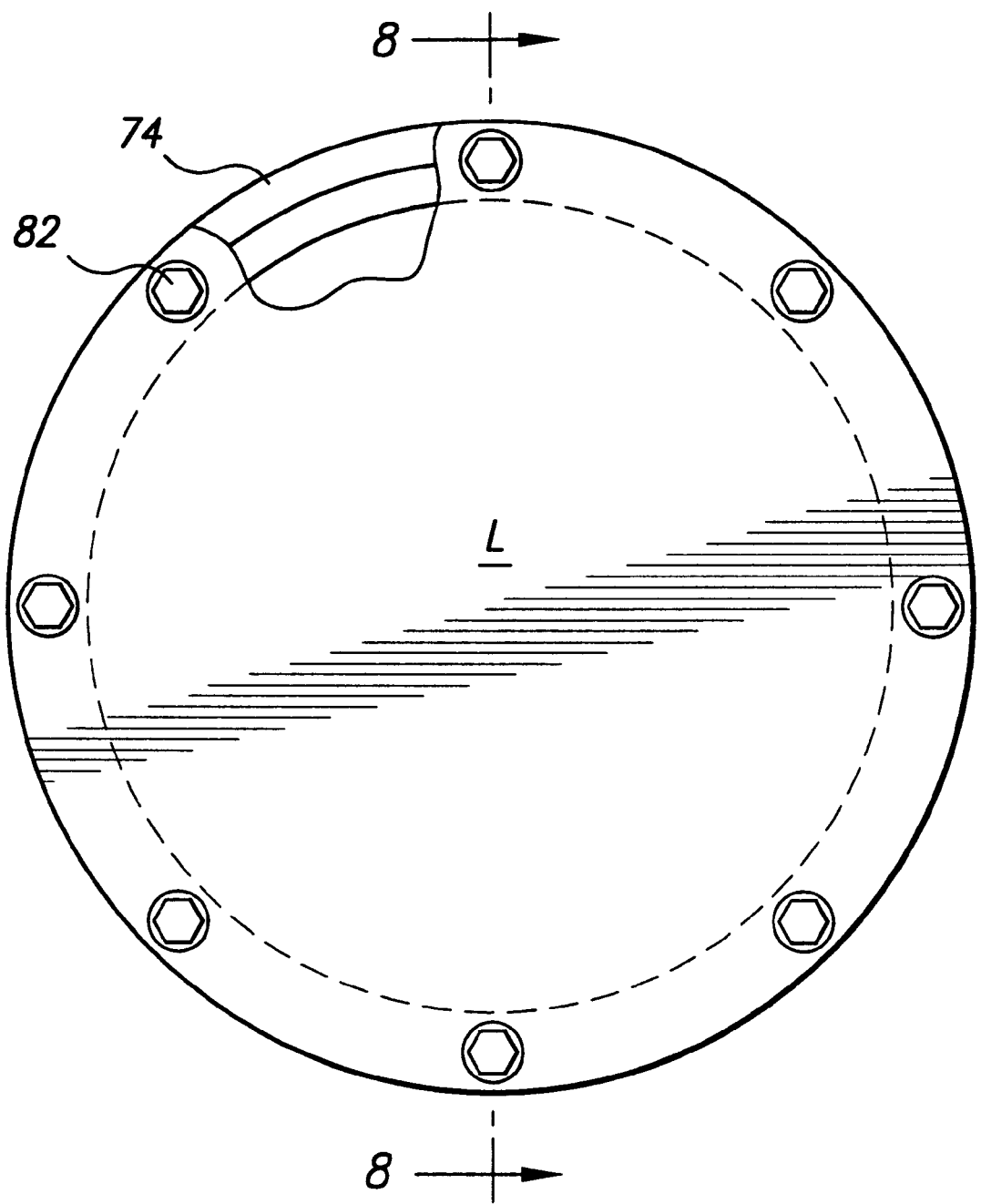
FIG. 7 is an end view of the lid employed in the inner container of FIG. 8.
Figure 8:
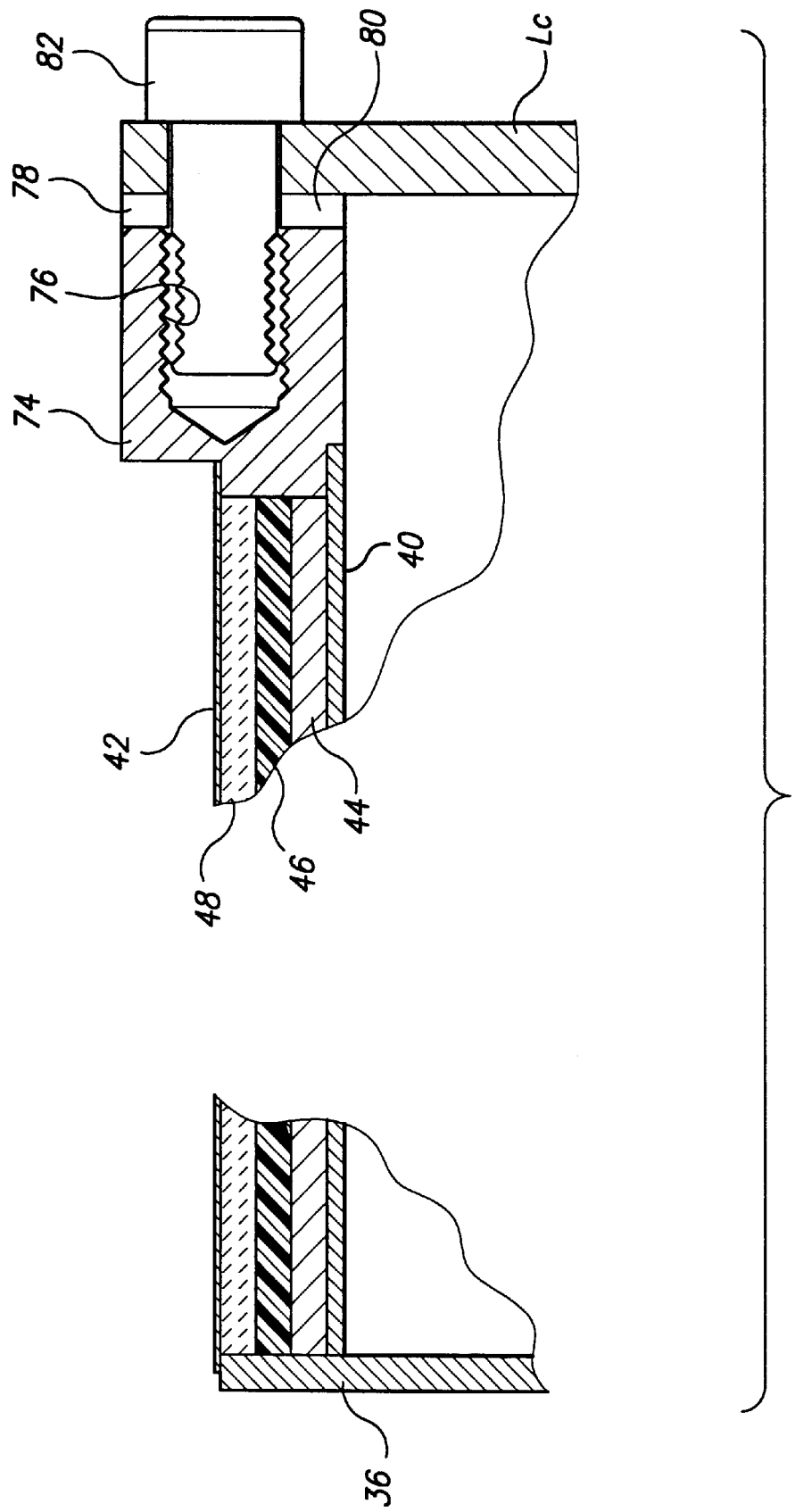
FIG. 8 is a fragmentary cross-sectional view of an inner container illustrating a further form of connection between the lid and inner container.

Referring to FIGS. 7 and 8, the lid Lc comprises a generally planar lid having a plurality of bolt holes about its periphery. The inner container side wall mounts a flange 74 containing blind threaded openings 76. An annular seal 78, preferably formed of silicon rubber, is provided between the lid Lc and mounting flange 74 and has openings 80 in registration with the openings and recesses in the lid and mounting flange. Upon application of the lid Lc to the mounting flange 74, and alignment of the bolt holes and seal holes with one another, bolts 82 may be threaded into the mounting flange to secure the lid to the inner container.

Figure 9:
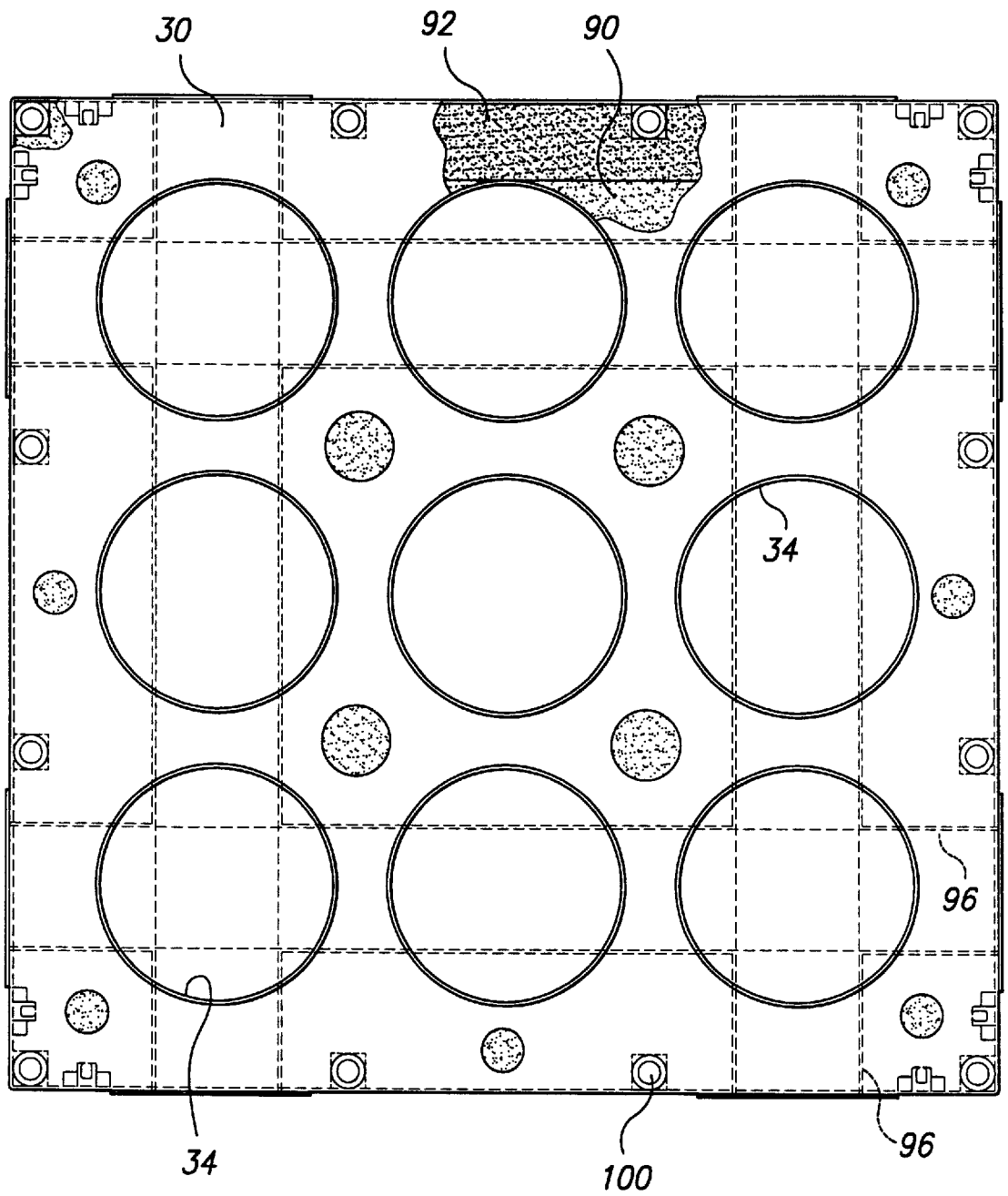
FIG. 9 is a top plan view of the outer container body.
Figure 10:
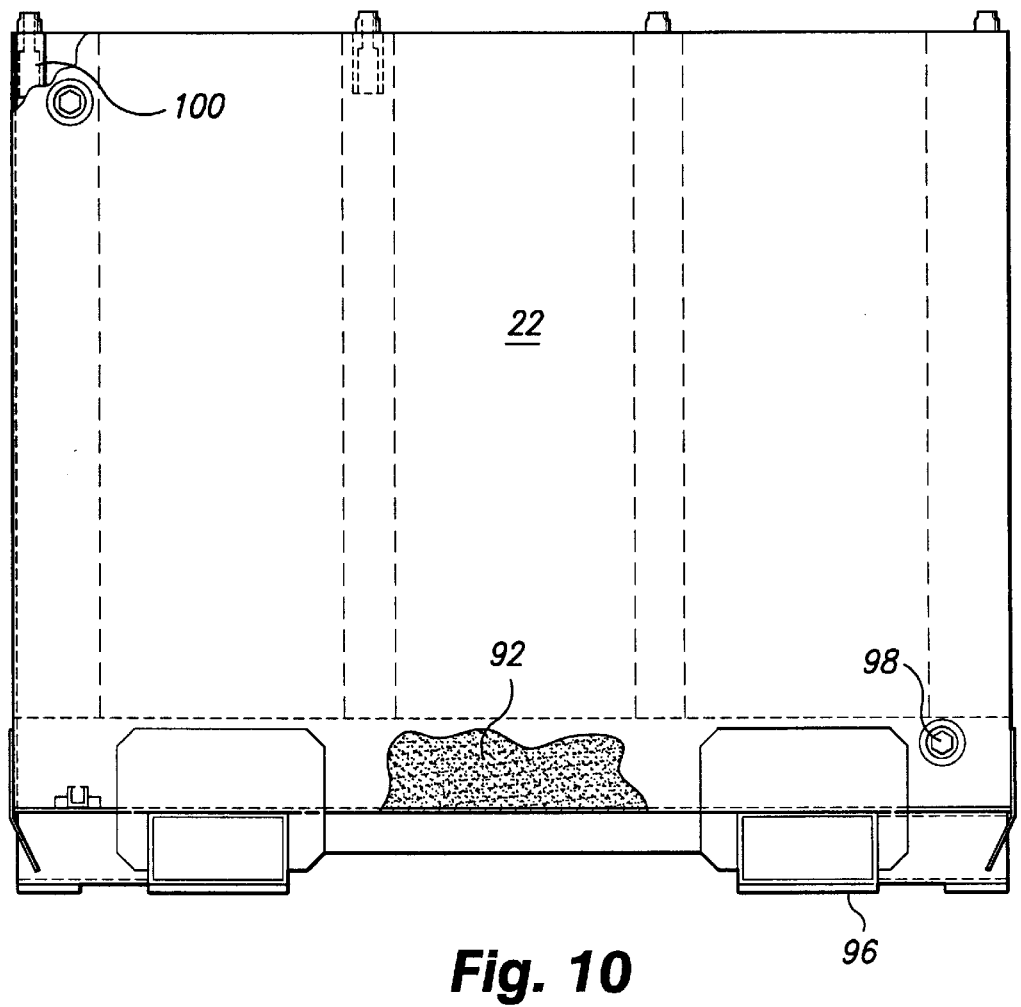
FIG. 10 is a side elevational view of the outer container body.

Referring now to FIGS. 2 and 9, the outer container body 22 as indicated previously includes a plurality of upstanding sleeves 34 which form contamination barriers. The sleeves 34 have open upper ends for receiving the inner containers. Thus, any contamination within the sleeves 34 can be readily removed because of the smooth contamination barrier surfaces. As illustrated, the cavities in the outer container body which receive the inner containers are disposed in an ordered array and preferably in a 3×3 array. Surrounding the sleeves 34 and filling the remaining portions of the volume of container body 22 is a plastic material, preferably a foamed polyurethane material. The polyurethane foam is provided in the interior of container body 22 in two different densities. A first foam 90 is provided between the sleeves 34, i.e., in the interstices between sleeves 34, and has a certain density, for example, 6–10 lbs/ft$^3$. A higher density polyurethane foam 92 is provided between the side walls 26 of outer container body 22 and the interior surface of the lower density polyurethane foam. This second higher density foam may have a density of approximately 15 lbs/ft$^3$. It will be appreciated that the foam reinforces the container and provides not only fire resistance but impact absorption. The higher density foam 92 also overlies the bottom wall 28 of the outer body container 22 as illustrated in FIG. 10. Thus, the inner containers, when disposed in sleeves 34, are spaced from the side walls 26 by both the high and low density foams, while the containers are spaced from the bottom wall by the high density foam.

Figure 11:
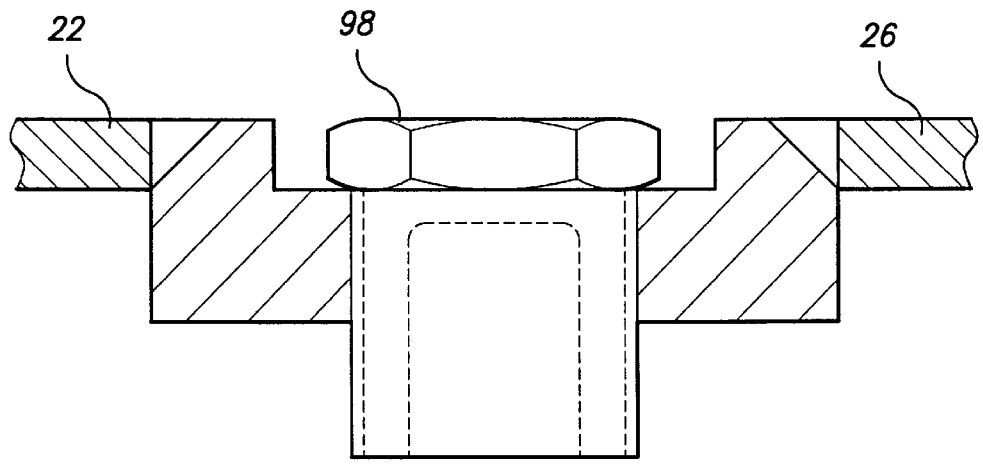
FIG. 11 is an enlarged fragmentary cross-sectional view of a meltable plug formed in the side wall of the outer container body.

Before discussing the outer container lid 24, and still referring to FIG. 2, the bottom of the container has a pair of longitudinally extending rectilinear guides 96 opening through each side of the container. The guides 96 are spaced from one another to receive through the open ends thereof the tines of a forklift. With the guides 96 opening in pairs through each of the four sides of the container, it will be appreciated that the container may be lifted by a forklift from any side of the container. Additionally, plastic plugs 98 (FIGS. 2 and 11) are disposed through the side walls 26 at one or more locations about the outer container body 22. The plugs are formed of a material which melts at a predetermined temperature in which the plug, when melted, vacates the opening through the side wall 26, providing communication between the interior of the container and its surrounding environs. Consequently, should the container be exposed to high temperatures such as a fire, any gases generated from heated plastic material within the container may be vented thereby to avoid rupturing the outer container 22. Further, a plurality of projecting threaded sockets 100 are provided along the interior of the side walls at spaced positions thereabout for receiving threaded bolts for securing the lid 24 to the outer container body 22. It will also be appreciated that the inner containers 32 have a length in excess of the length of the sleeves 34 whereby the upper margins of the inner containers project through the openings in the top wall 30 of the outer container body 22.

Figure 12:
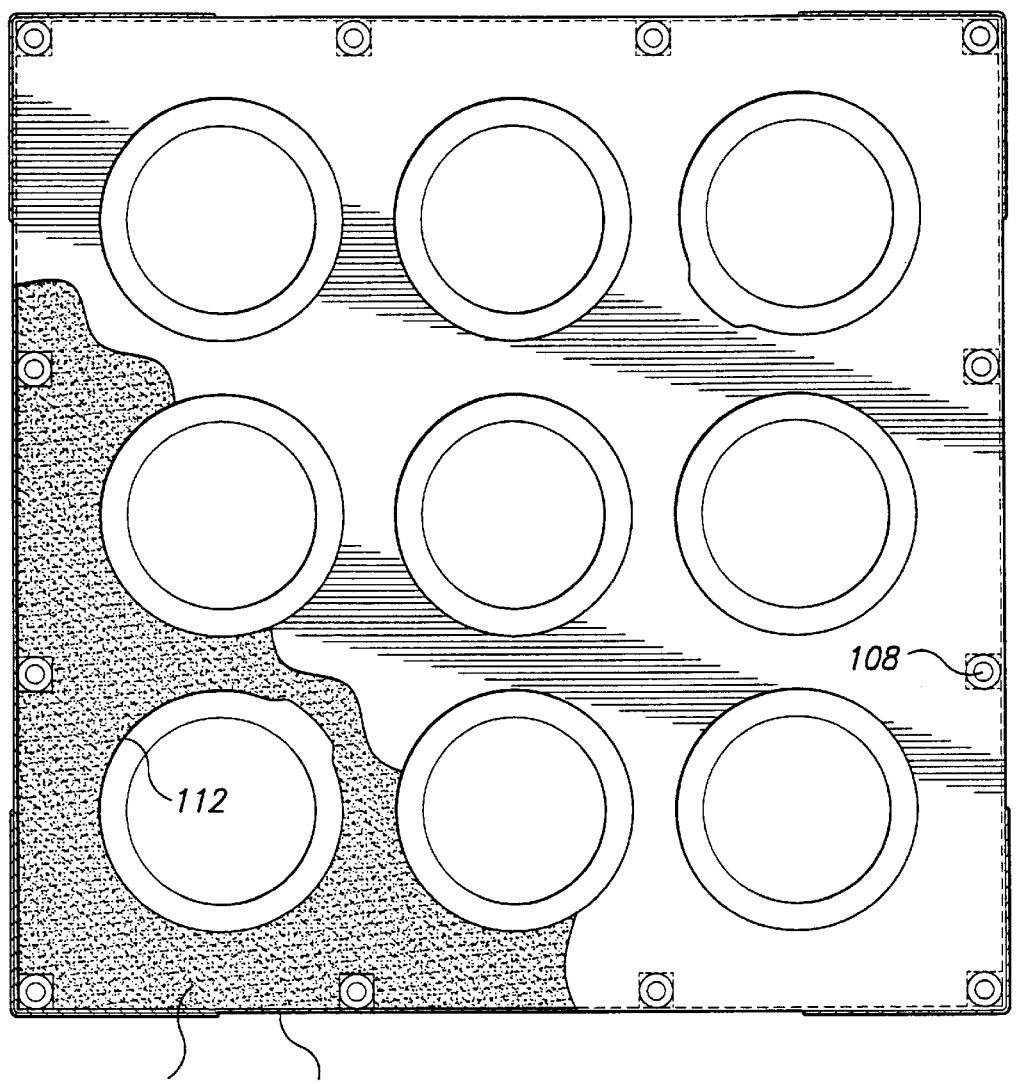
FIG. 12 is a bottom plan view with portions broken out illustrating the underside of a cover for the container body.
Figure 13:
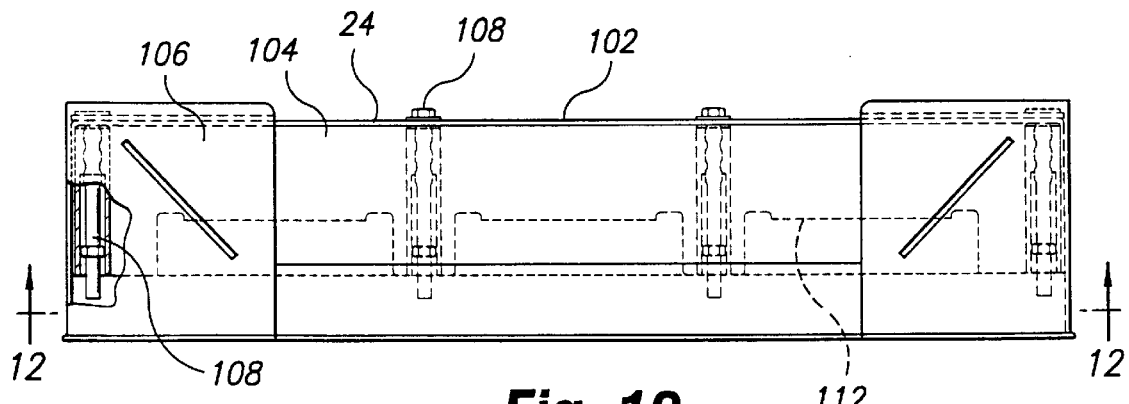
FIG. 13 is a side elevational view of the cover illustrated in FIG. 12.
Figure 14:
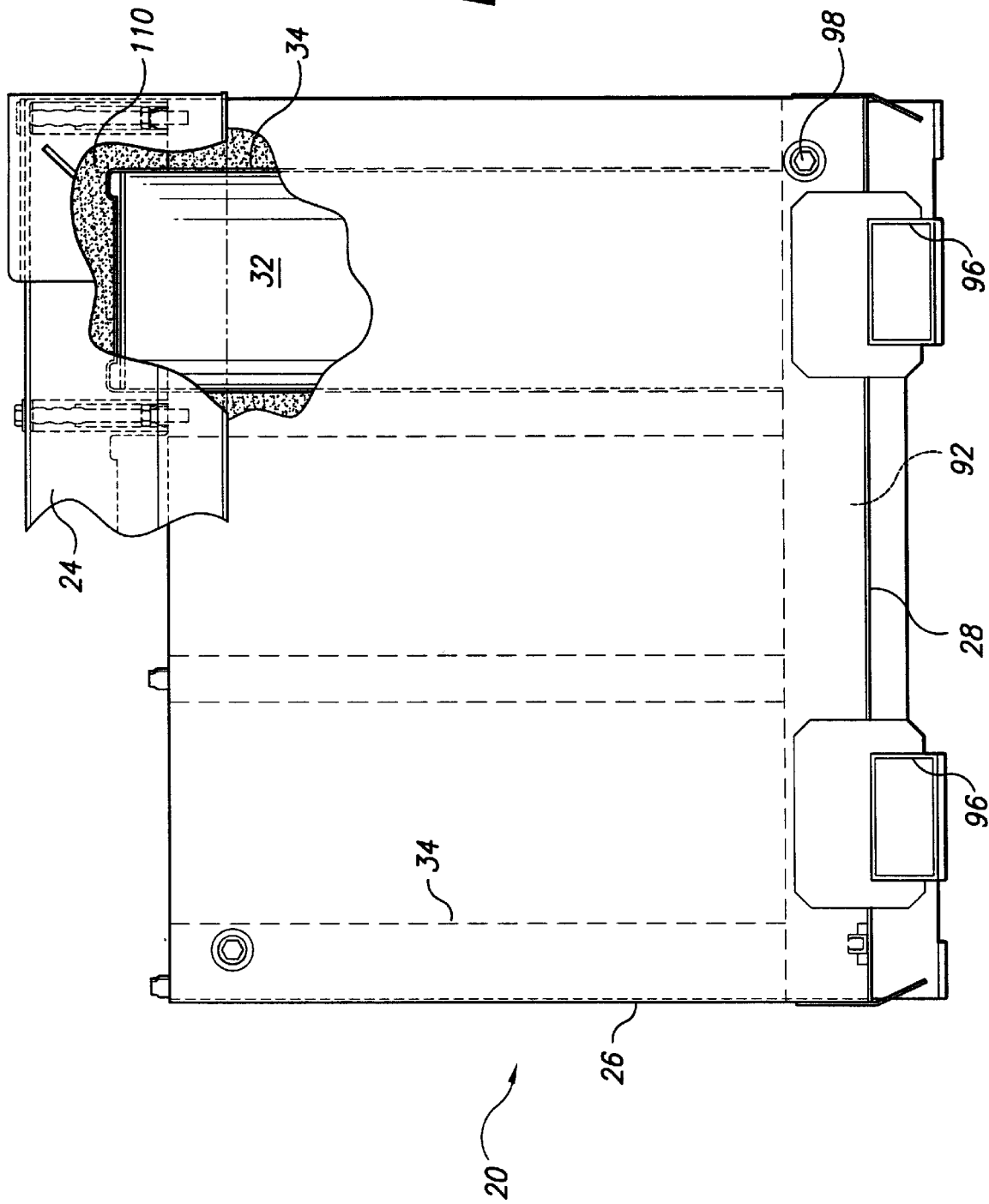
FIG. 14 is a fragmentary side elevational view with parts broken out and in cross-section of the container hereof.

Referring now to FIGS. 12 and 13, the lid 24 includes a top wall 102, four side walls 104 depending from the top wall 102, and four reinforcing gussets 106 formed at the corners of the cover 24. The cover 24 also includes a plurality of bolt holes for receiving the bolts 108 for bolting the cover 24 to the body 22.

Along the undersurface of the top wall 102 of cover 24, there is provided a foamed plastic material 110, such as the high density polyurethane foam formed about the margins of the container body. A plurality of recesses 112 (FIG. 13) are formed in the underside of the foamed plastic material 110 in registration with the openings through the top wall 30 of the container body for receiving the upper margins of the inner containers. As illustrated in FIG. 13, the recesses 112 are formed complementary in shape to the shape of the upper end of the inner containers. The recesses are also shaped to accommodate the bolts for the clamps on the container lids such that when the inner containers are received within the sleeves 34 and the lid is applied to the container body 22, the inner containers 32 are firmly secured within the container 20.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A uranium oxide shipping container comprising:
   an outer container; and
   a plurality of inner storage containers arranged in an ordered array within said outer container and spaced from one another and from said outer container, each said inner storage container comprising a cylinder for carrying a predetermined quantity of uranium oxide, said cylinder having a closed top, a closed bottom, and a cylindrical side wall having layered a nuclear poison and a nuclear moderator about said side wall, the spaces between said inner storage containers and between said inner storage containers and said outer container being filled with a plastic foam material.

2. The shipping container according to claim 1 wherein said outer container and said inner storage containers are formed of stainless steel.

3. The shipping container according to claim 1 wherein said nuclear poison comprises cadmium.

4. The shipping container according to claim 3 wherein said nuclear moderator comprises polyethylene.

5. The shipping container according to claim 1 wherein said spaces are filled with a polyurethane plastic foam material.

6. The shipping container according to claim 1 wherein said plastic foam material comprises first and second discrete foams thereof having different densities, said first foam lying within interstices between said inner containers and said second plastic foam material surrounding said first plastic foam material between side walls defining said outer container and outermost portions of said first plastic foam material, said second plastic foam material being of a density higher than the density of said first plastic foam material.

7. The shipping container according to claim 1 wherein said outer container contains a container body having side and bottom walls and a cover for overlying and closing said container body, said cover including a layer of fire and impact-resistant material.

8. The shipping container according to claim 7 wherein said material in said container body and said cover comprises a foamed plastic material.

9. The shipping container according to claim 8 including recesses formed along an underside of said foam plastic material in said cover for receiving projecting upper ends of said inner containers in said container body.

10. The shipping container according to claim 9 wherein said plastic foam material comprises first and second discrete foams of plastic material having different densities, said first foam material lying within interstices of said inner containers and said second plastic foam material surrounding said first plastic foam material between side walls defining said outer container and outermost portions of said first plastic foam material, said second plastic foam material being of a density higher than the density of said first plastic foam material, said foamed plastic material in said cover comprising foam having a density higher than the density of said first plastic foam material.

11. The shipping container according to claim 1 wherein said outer container includes a plurality of generally cylindrical upstanding sleeves spaced from one another in an ordered array thereof for receiving said inner containers.

12. The shipping container according to claim 1 wherein each said inner container has a lid, a container body component having a lid mounting flange and a seal between said lid and said component, said lid being bolted to said lid mounting flange.

13. The shipping container according to claim 1 wherein each said inner container has a lid, a container body component having a lid mounting flange and a seal between said lid and said component, said lid being clamped to said lid mounting flange.

14. The shipping container according to claim 1 wherein each said inner container has a lid, and a container body component having a rolled lid mounting flange, said lid having a marginal flange overlying said lid mounting flange.

15. The shipping container according to claim 1 wherein said inner container side wall includes a ceramic material, each said inner container side wall in a direction outwardly thereof formed of layers of stainless steel, cadmium, polyethylene, said ceramic material and a stainless steel outer layer.

16. The shipping container according to claim 1 wherein said plastic foam material comprises first and second discrete foams of plastic material having different densities, said first foam material lying within interstices of said inner containers and said second plastic foam material surrounding said first plastic foam material between side walls defining said outer container and outermost portions of said first plastic foam material, said second plastic foam material being of a density higher than the density of said first plastic foam material, said outer container having at least one plug through a wall thereof, said plug being meltable at a predetermined temperature to expose the foam material to a surrounding environment through the wall of said outer container.

17. The shipping container according to claim 1 wherein said inner containers are arranged in a 3×3 ordered array within said outer container.

* * * * *